United States Patent [19]

Audi et al.

[11] Patent Number: 4,728,379
[45] Date of Patent: Mar. 1, 1988

[54] PROCESS FOR MANUFACTURING LAMINATED GLASS

[75] Inventors: Josef Audi; Kurt Blank, both of Aachen; Friedrich Halberschmidt, Hersogenrath; Heinz Kunert, Cologne; Paul Roentgen, Roetgen-Rott, all of Fed. Rep. of Germany

[73] Assignee: Saint-Gobain Vitrage, Courbevoie, France

[21] Appl. No.: 666,072

[22] Filed: Oct. 29, 1984

[30] Foreign Application Priority Data

Oct. 29, 1983 [DE] Fed. Rep. of Germany ....... 3339320

[51] Int. Cl.⁴ .............................................. B32B 31/18
[52] U.S. Cl. .................................... 156/106; 156/107; 156/256; 156/267; 156/510; 156/524; 83/53; 83/177
[58] Field of Search ............... 156/106, 256, 264, 267, 156/510, 516, 517, 523, 524, 107; 83/53, 177, 467, 614

[56] References Cited

U.S. PATENT DOCUMENTS

| | | | |
|---|---|---|---|
| 3,455,197 | 7/1969 | Richardson | 83/467 |
| 3,467,332 | 9/1969 | Bachman | 83/614 |
| 3,806,387 | 4/1974 | Peetz et al. | 156/106 |
| 4,092,889 | 6/1978 | Fisher | 83/177 |
| 4,133,711 | 1/1979 | August et al. | 156/353 |
| 4,292,108 | 9/1981 | Weiss et al. | 156/353 |
| 4,302,283 | 11/1981 | Postupack | 156/106 |

FOREIGN PATENT DOCUMENTS

| | | | |
|---|---|---|---|
| 448209 | 6/1936 | United Kingdom | 156/106 |
| 2042398 | 9/1980 | United Kingdom | 83/177 |

OTHER PUBLICATIONS

SPE Journal, "Fluid Jet Cutter for Plastics", (83-177), vol. 28, No. 7, p. 5, Jul. 1972.

Primary Examiner—Caleb Weston
Attorney, Agent, or Firm—Pennie & Edmonds

[57] ABSTRACT

The invention relates to the manufacture of laminated glass, comprising glass sheets and plastic sheets. In the manufacture, glass and plastic sheets are each cut to a final dimension desired for use in laminated glass, assembled in a preliminary way, and, then, by the action of temperature and pressure formed to the laminate. The cutting of the plastic sheets, is carried out more particularly a plastic sheet of polyvinyl butyral as an interlayer between outer sheets of silicate glass is carried out by a high pressure water jet.

6 Claims, 2 Drawing Figures

PROCESS FOR MANUFACTURING LAMINATED GLASS

DESCRIPTION

1. Technical Field

This invention relates to the manufacture of laminated glass. In the manufacturing process precut sheets of glass which may be a silicate glass and thermoplastic are stacked and, then, assembled by action of heat and pressure. The invention also relates to an apparatus for carrying out the manufacturing process.

2. Background of the Invention

It is known that laminated glass has a special application for use in a motor vehicle. Typically, the laminated glass may comprise a windshield, and in the simplest of structures may be composed of two sheets of glass, such as silicate glass and an interlayer sheet of thermoplastic material.

The laminated glass may have a different structure when particular safety conditions are required. For example, it may be contemplated to provide the laminated glass with a special plastic sheet for protection against shattering. Such a special plastic sheet has been located to the surface of the laminated glass facing toward the interior of the vehicle, providing protection in the case of an accident and breakage of the laminated glass, and direct contact of an occupant with the sharp edges of pieces of broken glass. The protective sheet also prevents a spraying of shattered glass.

Various techniques of manufacture of laminated glass to improve properties of resistance to impacts are known, as well. These manufacturing techniques may envision an increase in the number of assembled lamina. For example, the laminated glass may include one or more layers of an impact resistant, synthetic material, such as polycarbonate.

In a typical process of assembly of a laminated glass, plastic sheets serving as an interlayer are cut to a dimension larger than necessary. The plastic sheets, after stacking of several lamina of the laminated glass, are then trimmed to the dimensions of the glass. Cutting of any projecting edges of the plastic sheets has been carried by hand trimming. It goes without saying that hand trimming is time consuming and likely very costly. In addition, it has been found that it is extremely difficult to cut the projecting edges of the plastic sheets in a very precise manner so that the plastic sheet comprising an inner lamina and the glass comprising outer lamina have exactly the same dimension after the final pressing. The cutting or trimming, thus, should be sufficient to leave no trace of the plastic sheet along the periphery of the glass.

Several proposals to accelerate the process of assembly of laminated glasses have been advanced. According to one process, described in U.S. Pat. No. 3,508,810, a plastic sheet interlayer is cut mechanically before the interlayer is assembled with the sheets of glass. The process envisions a mechanical cutting of the plastic sheet to the final desired dimension. Despite a precision in mechanical cutting it has been found that the plastic sheets deform under the conditions of heat and pressure necessary for the final assembly of the laminated glass. Deformation of the plastic sheets was evidenced by a flow of plastic from between the adjacent sheets of glass to the outside. This situation required implementation of remedial action following final assembly of the glass. The remedial action comprised a trimming step for the elimination of any trace of plastic along the periphery of the glass.

SUMMARY OF THE INVENTION

The invention is directed to a device and the process of manufacturing a laminated glass, which overcomes the various problems heretofore described. In particular, the invention is directed to apparatus and a process which obviates an operative step to be carried out on the plastic sheet following the final assembly steps when the glass laminate is subjected to temperature and pressure conditions. According to one aspect of the invention the plastic sheet for use in various types of laminated glass is cut to dimension by a high pressure water jet, before the elements forming the laminated glass are stacked. According to this aspect, the plastic sheet is cut to the exact dimension of the glass sheet or advantageously to a dimension slightly less than the dimension of the glass sheet.

In a variant of this aspect, the plastic sheet, likewise cut to dimension by a high pressure water jet, is cut after the elements forming the laminated glass are stacked. In the variant of the invention, the cutting may be likened to a manual, hand trimming cut. However, the cutting action by the high pressure water jet attains a precision that far exceeds the precision that may be attained with manual, hand trimming so that it is unnecessary to inspect the cutting after final assembly of the laminated glass.

According to the invention, the cutting operation may be carried out on a precut plastic sheet, commonly known as a "primitive", and the cutting operation may be carried out directly on the plastic sheet or on a continuous strip.

Cutting by a high pressure water jet has been found to provide several advantages. One important advantage is the speed of cutting by the high pressure water jet. Thus, the overall time of the cutting operation may be reduced. The overall time of cutting may be reduced further by the implementation of two or more high pressure water jets, each operating along one-half or a fraction of the periphery of the plastic sheet to be cut.

The properties of adherence of conventional interlayer sheets with a polyvinyl butyral base are known to be dependent, possibly highly dependent on their moisture content. Particularly, as the water content of the sheet increases, the capability of adherence of the sheet to the glass decreases. Therefore, it logically could be assumed that one would not contemplate the use of a technique of cutting such sheets with a high pressure water jet. This is because the cutting technique ivolves a direct contact between the water and the material of the sheet to be cut, which, it could be expected, could increase the water content of the sheet and militate against a good quality of adherence that the sheet must exhibit to the glass. Surprisingly, however, not only has there been no observed deterioration of the properties of adherence of the sheet, the cutting technique has given rise to an unexpected effect. To this end, it has actually been found and observed that the plastic sheet cut by a high pressure water jet, unlike a plastic sheet that is cut mechanically, was not deformed at the cutting edges during residence in an autoclave under the action of the heat and the pressure and during final assembly with the other lamina forming the glass laminate. Rather, and importantly, plastic sheets cut by high pressure water jet have been found to keep their shape at all points. Thus, according to the invention, it is possible for the first time to manufacture laminated glass having an interlayer sheet with a dimension slightly less than the dimension of the adjacent glass sheets, and to provide a channel around the periphery of the glass sheets. The channel may be filled, for example, with another composition, or used for another purpose. For example, the channel around the periphery of the glass sheets may be used to degas the assembly of sheets. In addition, the channel around the periphery of the glass sheets may be used to locate an attachment of protective shape to protect the edges of the glass sheets.

A device suited for implementing the cutting process with a water jet is described in U.S. Pat. No. 4,092,889. According to the patent, a piece to be cut is conveyed on a support comprising a flexible belt toward a cutting tool mounted on a carriage. The carriage is adapted for movement along a bridge which also is movable. At least three pulleys are located below the support. The pulleys provide for a change in direction of movement of the support and a reversal or turning of the flexible belt. To this end, two pulleys are located at the level of the support to assure the change in direction of movement or position of the support from a position substantially horizontal to a position that the support moves in a perpendicular direction, downward. The other pulley or pulleys are located within a lower plane. The location of the pulleys in a lower plane is such that the belt forms a loop below a slot. The slot extends crosswise to the direction of movement of the belt and moves with the bridge. Under circumstances that the cutting tool is a high pressure water jet, the slot provides an opening for passage of the water from the water jet following the cutting action.

The invention improves upon the device described by the last-mentioned patent so that it is particularly suited for cutting plastic sheets, such as sheets comprised of polyvinyl butyral with a high pressure water jet. To this end, the slot is located along either the X-axis of Y-axis within an X-Y coordinate system and extended to be at least coextensive with the width of the belt. The slot is adapted to move in the other coordinate direction in synchronism with the movement of the cutting head of the high pressure water jet. It may be assured, therefore, that for each position of the cutting head or nozzle, the high pressure water jet can actually cross the horizontal plane of the belt which simultaneously supports the adjacent surface of the plastic sheet undergoing cutting. A receiving tank for the water used in high pressure cutting is located below the slot and similarly extends over the entire width of the belt.

According to a particularly advantageous embodiment, the flexible belt that forms the support is an endless belt having an upper and a lower run. The belt is driven by any suitable drive means, such as a motor and operates in both the conveyance of each plastic sheet to be cut and in positioning the plastic sheet on the support.

Other characteristics and advantages of the invention will be brought out as the description of various variant embodiments, to be considered with a consideration of the drawing, continues.

BEST MODE FOR CARRYING OUT THE INVENTION

The apparatus, as briefly described above, for cutting sheet material is suited for cutting plastic sheets, such as thermoplastic adhesive layers for laminated glass and plastic sheets used in laminated glass, for example. The apparatus is also suited for cutting any one of an outer sheet for protection against shattering, an inserted sheet, or an impact resistant covering sheet.

Figure 1:
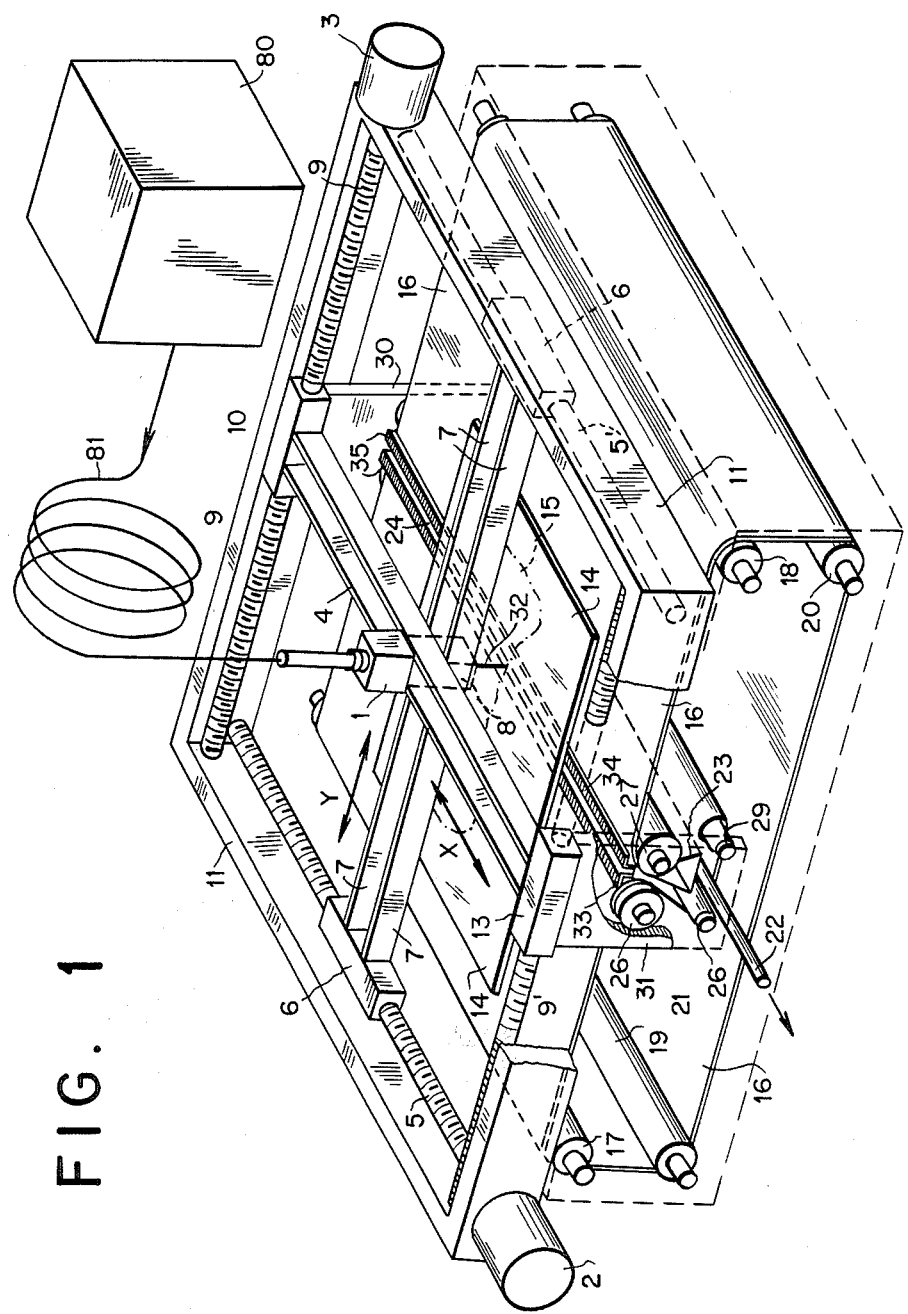
FIG. 1 is a perspective view of a first form of apparatus according to the invention.

As will be described with particularity, the apparatus is an automatic machine which comprises a carriage 1 controlled by a program in movement within an X-Y coordinate system. Referring to FIG. 1, the carriage is controlled in movement along the X-axis by a motor 2, and along the Y-axis by a motor 3. The motors, in turn, are controlled by a programmable control (not shown).

The particular mounting structure for mounting the carriage includes a bridge 4 and a bridge 7, each comprising a pair of slide rods. Both bridges are movable, individually and in compound movement, in the movement of the carriage, within the confines of a frame 11. As illustrated in FIG. 1, the mounting structure also includes a pair of spindles 5, 5' and spindle holders 6 for supporting bridge 7, and a pair of spindles 9,9' and spindle holders 10, 13 for supporting bridge 4. Each spindle is supported at its ends by frame 11 in a manner to extend between opposite side walls and in a position closely spaced from an adjacent side wall. The spindles of each pair of spindles are disposed in a parallel disposition, and the pair of spindles 5,5' are disposed somewhat below the pair of spindles 9, 9'. The spindles 5, 5' are used to mount spindle holders 6, and the spindles 9, 9' are used to mount spindle holders 10, 13, respectively. Motor 2 drives spindle 5 in rotation for movement of spindle holders 6 and bridge 7 along the X-axis as indicated by the "X" directional arrows. Motor 3 drives spindle 9 for movement of spindle holders 10, 13 and bridge 4 along the Y-axis as indicated by the "Y" directional arrows. Spindles 5' and 9' which rotate at the same angular velocity following rotation of spindles 5 and 9, respectively, function as idler spindles.

Carriage 1 supports a nozzle 8 providing a source of a high pressure water jet. In carrying out the cutting operation the carriage is movable along bridge 4 in the directions of arrows "X", and along bridge 7 in the directions of arrows "Y". An element supported by carriage 1 slides between slide rods 7 so that the carriage under control of motor 3, can move in the Y-direction. The element undergoes a similar sliding action between the pair of slide rods of bridge 4 so that the carriage, under control of motor 2, can move in the X-direction.

A belt 16 functions to support a sheet material 14, such as a plastic sheet of polyvinyl butyral, that is to be cut. The belt may be an endless, flexible belt having an upper run between rollers 17, 18 and a lower run between rollers 19, 20. The rollers are arranged so that they are coaxial with the spindles 5, 5' in a rectangular pattern. The upper run of the belt between rollers 17, 18, is entrained about a further series of rollers of pulleys 26, 27, 28 and 29. The entrained belt forms a loop 21.

Referring still to FIG. 1, it may be seen that the loop 21 is to provide an open slot 24 located below and along the length of bridge 4. The loop, as will be discussed, moves in synchronism with bridge 4 so that slot 24 always locates to a position below nozzle 8. The slot has a width determined by the spacing between the peripheral surfaces of rollers 26, 27.

A pair of plates 30, 31 extend from spindle holers 10, 13, respectively. The plates are spaced outwardly of belt 16 and extend below the upper run of the belt. The plates provide a mount for each roller of the pulleys 26, 27, 28, and 29. The rollers of pulleys 26, 27 comprising the upper rollers are located so that their peripheral surface is in position to hold the upper run of belt 16 substantially in the plane defined by the upper surfaces of rollers 17 and 18.

The particular path of belt 16 along the loop is not important other than that the loop provides sufficient internal space for a tank 23. The tank may be supported by plates 30, 31 and provides a receiving opening located below slot 24 for collecting water from nozzle 8. Preferably, the tank and receiving opening will extend throughout at least one width of the belt. A pipe 22 may connect with an internal reservoir whereby accumulated water may be emptied from the tank.

A pair of members 33, 34 are located between the rollers of pulleys 26, 27. The members are of L-shaped angle section and may be fastened at their ends to plates 30, 31. One leg, a horizontal leg, of each section is located substantially in the plane defined by the upper surfaces of rollers 17 and 18, while the other leg may extend downward to provide protection for the belt as it moves around the rollers of pulleys 26, 27 into and out of the loop 21. The other legs, also, will define the width of slot 24. Grooves 35 are formed crosswise in the outer face of the horizontal leg of each member. The grooves produce a balancing of the air pressure produced during operation. Thus, because of the partial vacuum created by the water jet in slot 24 sheet material 14 flattened against members 33, 34 is prevented from adhering to the members, leading possibly to a movement of the sheet material on the belt.

A unit 80 provides a source of water. A pipe 81 provides communication between unit 80 and nozzle 8. Quite obviously, the pipe 81 will be capable of withstanding a high pressure of the source.

Figure 2:
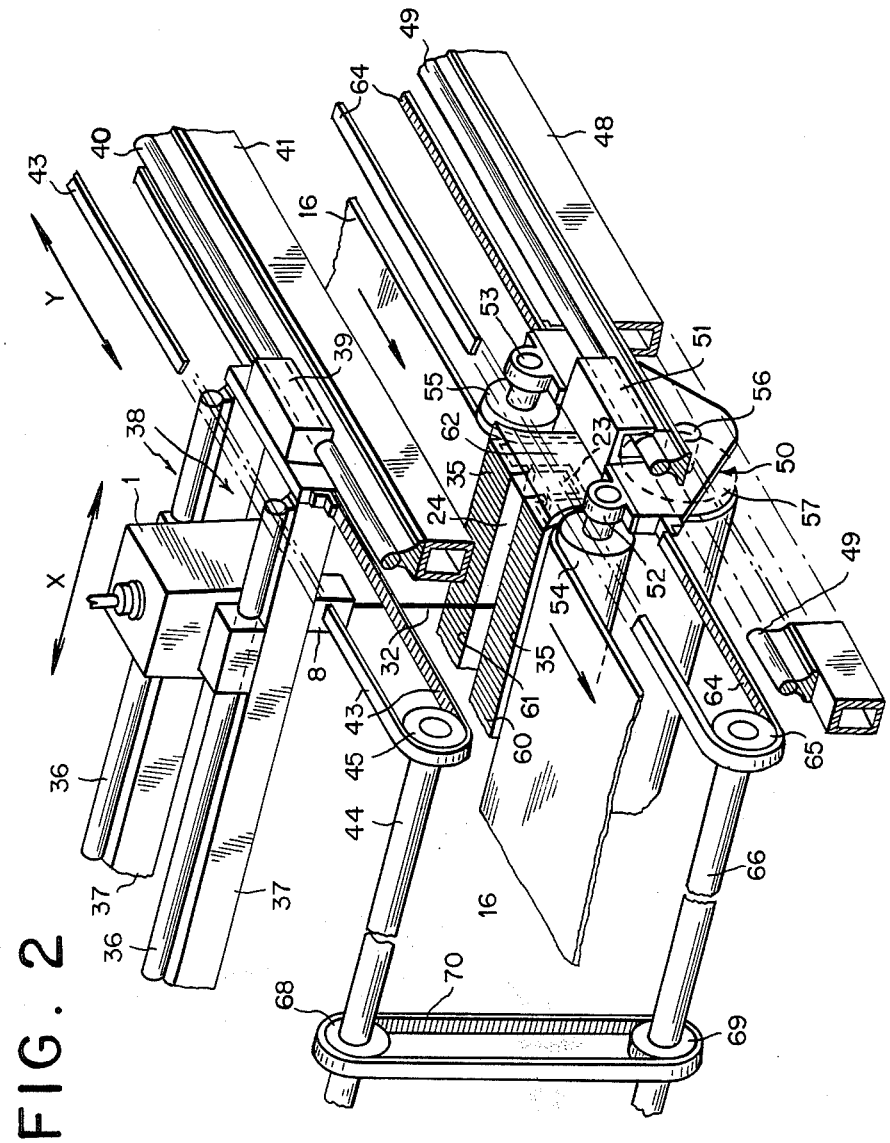
FIG. 2 is a perspective view of another form of apparatus according to the invention.

FIG. 2 represents another embodiment of apparatus of the invention. According to this embodiment, carriage 1 and nozzle 8 are mounted for movement in the X-direction along slides 36. The particular drive for the carriage is not shown for reasons of clarity. Slides 36 are located on support sections 37 which comprise a bridge 38. The bridge is housed by a pair of slide bearings 39 (only one slide bearing is shown) and movable along slides 40 in the Y-direction. Slides 40 are located on a frame 41 of the apparatus and, like slide bearings 39, only a single slide 40 and frame 41 are shown.

The drive for bridge 38 comprises a pair of toothed belts 43 (only one belt is shown). The belts are driven by motor (not shown) through a drive shaft 44 and gears 45. The motor preferably is controlled by a digital control system.

A second frame 48 is located below and parallel to frame 41. Frame 41 maybe considered an upper frame. A pair of slides 49 (only one slide is shown) are mounted on frame 48 in spaced parallel relation. A carriage 50 is mounted by the slides. The mounting instrumentality may comprise a pair of slide bearings 51 which are movable along the respective slides.

Two pivot bearings 52, 53 which are upper bearings and a lower bearing 56 are carried by carriage 50. Return pulleys 54, 55 are mounted for free rotation in the pivot bearings 52, 53, respectively, while a return pulley 57 is mounted for free rotation in the lower bearing 56. The return pulleys provide the function of pulleys 26, 27, 28, and 29 of the FIG. 1 apparatus. The return pulleys are located to describe a loop path for belt 16. Thus, belt 16 approaches return pulley 55, along a horizontal run, and is inclined downwardly by the location of return pulley 57. The belt, again, returns to the same horizontal run after passing around return pulley 54 located above return pulley 57.

A pair of members 60, 61, like the members 33, 34, are located with respect to the upper return pulleys 54, 55. The members are connected to carriage 50 by means of a plate 62. The members are shaped like the members 33, 34 and function in a similar manner. Thus, the members define a slot between their vertical legs, which also provide protection for the belt as it moves around the rollers. The other legs are also grooved by grooves 35 which function to balance air pressure.

The slot between members 60, 61 and the loop formed by return pulleys 54, 55 and 56 of the apparatus provide the functions heretofore described. And, a tank (not shown) is located within the loop for accumulating water from the operation of cutting with the high pressure water jet.

A pair of toothed belts 64 (only one belt is shown), gears 65 and drive shaft 66 drive carriage 50 and return pulleys 54, 55, 57. The drive through drive shaft 66 is also used to drive bridge 38 through drive shafts 44. The connection of drive shafts 44 and 66 is completed by gears 68, 69 and toothed belts 70.

Belt 16 functions not only as a support for sheet material 14 to be cut, but also as a conveyor belt for feeding the sheet material to the cutting station and removing the sheet material from the cutting station.

In operation of the FIG. 1 apparatus, sheet material 14 to be cut is conveyed by belt 16 to a cutting station (in vertical alignment with nozzle 8 and slot 24, described by members 33, 34 or 60, 61). As may be appreciated a second conveyor (not shown) of any form may be provided for moving the sheet material onto the belt. Alternatively, the sheet material may be located to belt 16 by manual handling. The belt is driven by drive means (not shown) having a drive input connected to one of the rollers 17, 18, 19, or 20. For example, the drive may be connected to roller 17. The drive preferably will be at the same speed as the drive to the second conveyor so that the sheet material moves through the apparatus at a constant rate. As soon as sheet material 14 is in the proper position relative to carriage 1 and nozzle 8, the motor driving belt 16 is stopped and locked. Locking may be carried out by a built-in brake which locks roller 17. In the same manner, and simultaneously with the braking of roller 17, roller 18 is locked in position by the action of a brake (not shown). In this way, belt 16 is kept from stretching or changing position, situations which are likely to bring about a change in the position of sheet material 14 during the cutting phase. During the cutting phase, the slot created by the belt in the loop around pulleys 26, 27, 28 and 29 moves in synchronization with the carriage. As soon as the cutting phase is completed, roller 18 is released, and the belt 16 is driven, once again, to move the sheet material 14 away from the cutting station. The belt, then, is conditioned for receipt of the next sheet material to be cut.

The apparatus can be installed along a production line for laminated glass. The production line may comprise one or more other cutting apparatus for sheets of silicate glass. These cutting apparatus also operate with a carriage under control of the same program controls. Simply, instead of equipping the carriage with a nozzle for a high pressure water jet, the carriage may be equipped with a mechanical cutting tool for cutting glass sheets. The cutting program used for both apparatus may be, for example, stored in the form of a magnetic tape. The sheets which are cut are stacked on one another and, after an appropriate degassing step which is known, subjected to heat and pressure in an autoclave thereby to obtain the final assembly of the sheets making up the glass laminate.

We claim:

1. A process for manufacturing a laminate of glass and plastic sheets, which comprises:
    providing a glass sheet having predetermined dimensions;
    accurately and precisely cutting a polyvinyl butyral sheet to predetermined final dimensions by high pressure water jet means, the predetermined final dimensions of said polyvinyl butyral sheet being no greater than the predetermined dimensions of said glass sheet;
    stacking said glass and polyvinyl butyral sheets in contact relation and in alignment for formation of the laminate;
    subjecting said stacked sheets to the action of elevated temperature and pressure so as to form a laminate, whereby the polyvinyl butyral sheet does not extend beyond a peripheral dimension of the glass sheet, thus avoiding trimming and further cutting of said polyvinyl butyral sheet; and further whereby the adherence of said polyvinyl butyral sheet to said glass sheet is unaffected and the optical properties of said polyvinyl butyral sheet remain unaffected for clear viewing through the laminate.

2. The process according to claim 1 wherein each polyvinyl butyral sheet is cut to a dimension slightly less than the dimension of said glass sheet.

3. The process according to claim 1 which further comprises providing more than one of said high pressure water jet means for further reducing the time required for cutting or trimming said polyvinyl butyral sheet.

4. The process according to claim 1 which further comprises forming a laminate having at least two of said glass sheets with at least one precut polyvinyl sheet interposed therebetween.

5. The process according to claim 4 which further comprises cutting the polyvinyl butyral sheet to a dimension slightly less than the dimension of the glass sheet, thus providing a channel around the periphery of said glass sheets.

6. The process according to claim 5 which further comprises locating an attachment of protective shape within said channel to protect the edges of the glass sheets.

* * * * *